United States Patent

Toyano et al.

[11] Patent Number: 5,158,307
[45] Date of Patent: Oct. 27, 1992

[54] CHUCK FOR MACHINE TOOLS

[75] Inventors: Hidekatsu Toyano, Kounan; Eiichi Morisaki, Nagoya, both of Japan

[73] Assignee: Howa Machinery, Ltd., Nagoya, Japan

[21] Appl. No.: 836,999

[22] Filed: Feb. 14, 1992

[30] Foreign Application Priority Data

Feb. 16, 1991 [JP] Japan .................................. 3-44125

[51] Int. Cl.$^5$ ............................................ B23B 31/16
[52] U.S. Cl. ...................... 279/121; 279/124; 279/125
[58] Field of Search .............. 279/121, 110, 123-125, 279/152, 153

[56] References Cited

U.S. PATENT DOCUMENTS

| | | | |
|---|---|---|---|
| 4,007,943 | 2/1977 | Scharfen et al. | 279/121 |
| 4,026,566 | 5/1977 | Röhm | 279/121 |
| 4,198,067 | 4/1980 | Steinberger | 279/121 |

FOREIGN PATENT DOCUMENTS 63-15085  4/1988  Japan.

Primary Examiner—Steven C. Bishop
Attorney, Agent, or Firm—Ladas & Parry

[57] ABSTRACT

A machine tool chuck in which a wedge member is provided to cause radial displacement of workpiece clamping pawls for replacement. The replacement can be made with minimum variations in radial position at which the clamping pawls are relocated. To this end, the clamping pawls and slide blocks are slidably guided radially through a chuck body independently of each other. Each clamping pawl and each slide block are in slidable engagement with a sloping wedge action portion of an axial slidable wedge bar in such a way that axial displacement of the wedge bar will force both the clamping pawl and the slide block to move radially independently of each other while maintaining the geometric relationship therebetween. For replacement of the clamping pawl, the wedge bar is moved backward to cause its wedge action portion to be disengaged from the clamping pawl whereby the clamping pawl can be slid radially outwardly for replacement.

7 Claims, 5 Drawing Sheets

CHUCK FOR MACHINE TOOLS

BACKGROUND OF THE INVENTION

The present invention relates to a machine tool chuck of the type in which workpiece clamping pawls can be quickly slid out in the radial direction for replacement.

A known machine tool chuck of the type described above and disclosed in Japanese Patent Publication No. 63-15085 published Apr. 2, 1988 generally comprises a chuck main body, master jaws radially slidably fitted in the chuck main body, and workpiece clamping pawls radially slidably fitted in the chuck main body in opposing relationship with the master jaws, respectively, on the forward side of the body. Each master jaw has therein an axially slidable engaging member having on the forward face thereof rack teeth in mesh with rack teeth formed on the back surface of the corresponding workpiece clamping pawl. The engaging member can be moved in the axial direction by a radially shiftable operation pin in the master jaw. The master jaw is slidably engaged with an inclined groove of a wedge plunger. With the rack teeth of the engaging member maintained in mesh with the rack teeth of the clamping pawl, the wedge plunger is displaced in the axial direction of the chuck main body so that the clamping pawl is moved in the radial direction by the master jaw which is guided in the radial direction with high degree of accuracy. When the engaging member is axially retracted and its rack teeth are disengaged from the rack teeth of the clamping pawl, the pawl is released and can be slid in the radial direction for replacement.

In the known chuck of the type described above, in order to make the master jaw integral with the corresponding clamping pawl, the rack teeth of the master jaw are caused to engage with the rack teeth of the clamping pawl However due to errors which may occur from machining the engaging portions of the rack teeth, while replacing the clamping pawls, the positions in the radial direction of the replaced clamping pawls with respect to their corresponding master jaws tend to be slightly deviated so that the accuracy with which the chuck holds the workpiece becomes low.

SUMMARY OF THE INVENTION

In view of the above, the primary object of the present invention is to provide a machine tool chuck of the type in which a clamping pawls are replaceable in the radial direction and in which the workpiece can be held by the pawls with high degree of accuracy irrespective of replacement.

According to this invention, there is provided a chuck for machine tools of the type having a main body with a rotational axis, wedge members provided in said main body so as to be slidable axially of the main body, and workpiece clamping pawls fitted in the main body so as to be movable radially of the main body, said clamping pawls slidably engaging said wedge members, respectively, so as to be removed radially outwardly from the main body for replacement, in response to axial sliding movement of the wedge members: said chuck comprising slide blocks fitted in said main body so as to be slidable radially of the main body, said slide blocks being disposed axially behind said clamping pawls so as to be associated with the same, respectively; wedge action means provided on said wedge members, respectively, and extending slopingly relative to the rotational axis, said wedge action means normally slidably engaging both said clamping pawls and said slide blocks and having such a length as to be disengaged from the clamping pawls to release the same when the wedge members are axially moved away from the clamping tools to a limit position; and positioning means interposed between the associated slide blocks and the clamping pawls to releasably engage the slide blocks and the clamping pawls at their predetermined relative radial position.

With the construction above, when a workpiece is to be clamped by the chuck, the clamping pawls are directly forced to move radially inwardly due to the engagement between the clamping pawls and the wedge action means of the wedge member. For removing the clamping pawl, the wedge action means of the wedge member is released from the clamping pawl by axially shifting the wedge member to a limit position, and then the positioning or locating means between the sliding block and the clamping pawl is released to make the clamping pawl free for removal of the clamping pawl out of the chuck body in the radial direction. Thereafter, another clamping pawl is inserted into the chuck body in the radial direction and is located at a predetermined position with respect to the sliding block by means of the positioning or locating means, and then the wedge member is displaced in the axial direction to engage its wedge action means with the new clamping pawl. Thus, the replacement of the clamping pawl is accomplished.

According to this invention, the replacement of the clamping pawls can be carried out reliably. When the replacement has been made, the wedge action means of the wedge member is again brought into engagement with the new clamping pawl so that variations in radial position of the new clamping pawl can be remarkably reduced to a minimum and therefore the accuracy with which the chuck holds the workpiece can be increased to an extent hitherto unattainable by the prior art.

The present invention will become more apparent from the following description of some preferred embodiments thereof taken in conjunction with the accompanying drawings.

DETAILED DESCRIPTION OF THE PREFERRED EMBODIMENTS

Figure 1:
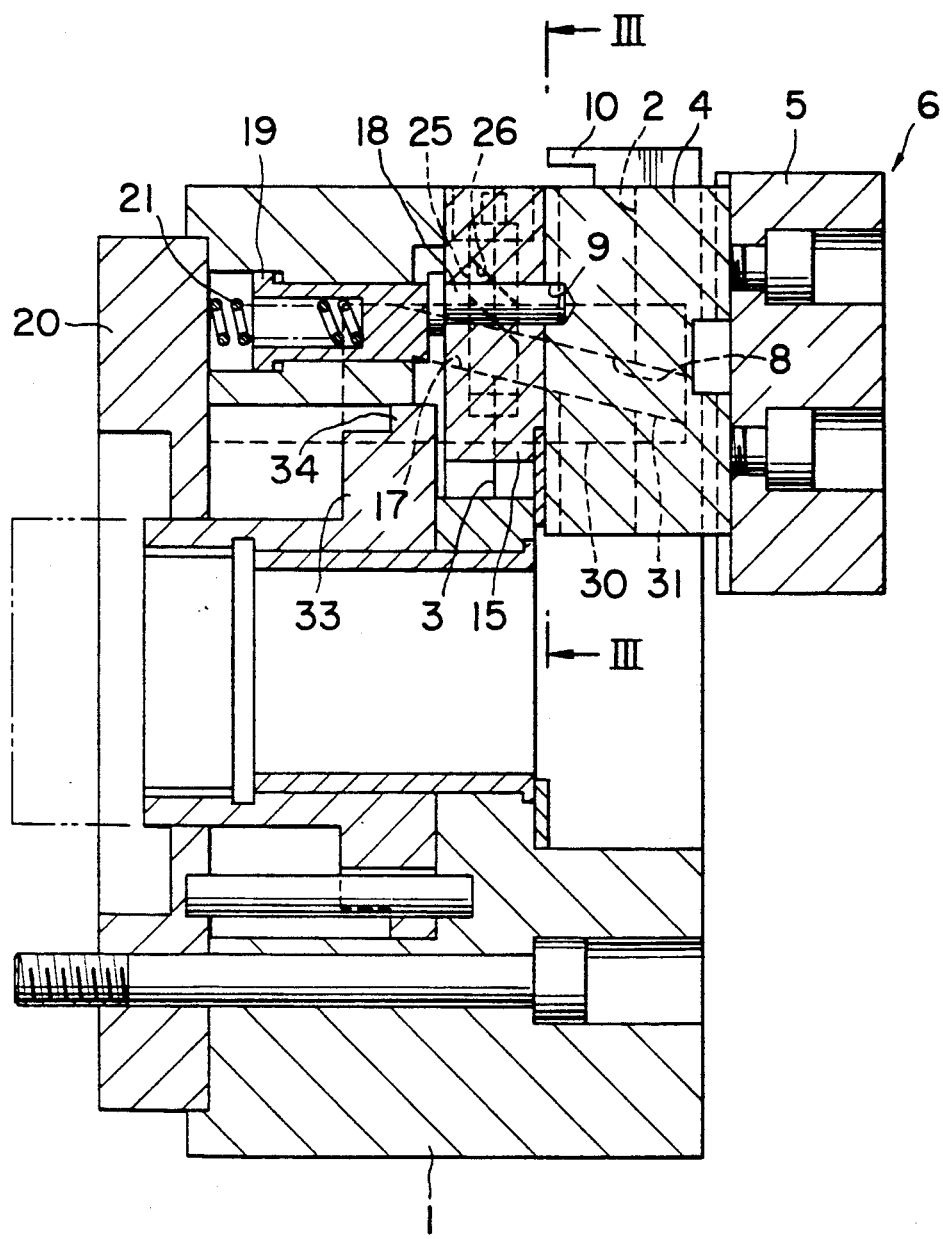
FIG. 1 is an axial sectional view of a first embodiment of the machine tool chuck in accordance with the present invention.
Figure 4:
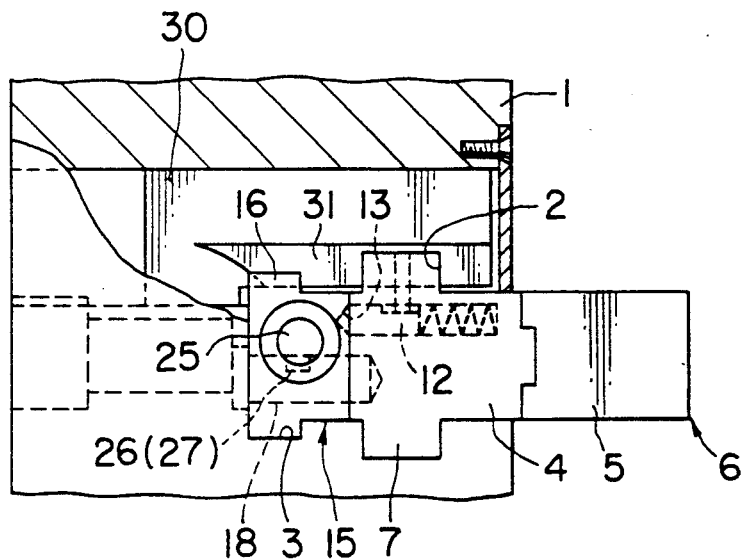
FIG. 4 is a fragmentary top view illustrating major parts of the first embodiment.
Figure 6:
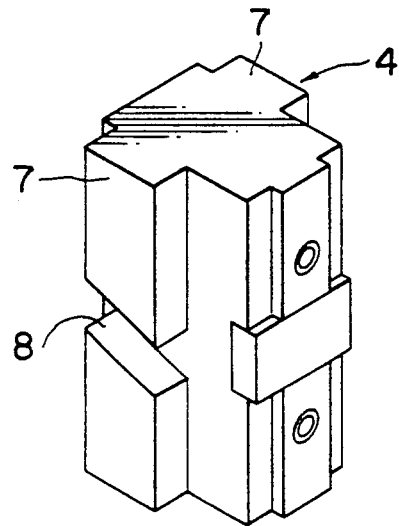
FIG. 6 is a perspective view of a base jaw of the clamping pawl.

Referring now to FIGS. 1 and 4, a chuck main body generally indicated by reference numeral 1 has in a forward (righthand as viewed) face thereof a plurality (for instance, three) of pairs of radially extending opposite pawl guide grooves 2. A radial block guide groove 3 is provided backwardly of each pawl guide groove 2. A pair of bar-shaped guides 7 project from the opposite side surfaces of a base jaw 4 which constitutes, together with a top jaw 5, a workpiece clamping pawl 6. The guides 7 are radially slidably fitted into the respective pawl guide grooves 2. As best shown in FIG. 6, an inclined wedge groove 8 is formed at the mid portion between the radial ends of each bar-shaped guide 7. As shown in FIG. 1, a pin recess 9 into which is fitted a safety pin 18 to be described hereinafter is drilled into the back surface of the base jaw 4. A hook 10 for engagement with a pawl engagement member 11 (FIG. 7B) of a pawl replacement device (not shown) is securely attached on the upper surface of the base jaw 4. As shown in FIG. 4, a positioning or locating pin 12 (illustrated here as one of examples of locating or positioning means) is axially slidably fitted in the base jaw 4 in such a way that it is normally biased backwardly (to the left as viewed in FIG. 4) and is prevented from being pulled out of the base jaw 4. The tip end of the positioning or locating pin 12 is engaged with a locating recess 13 of a slide block 15 provided backwardly of the base jaw 4.

Figure 5:
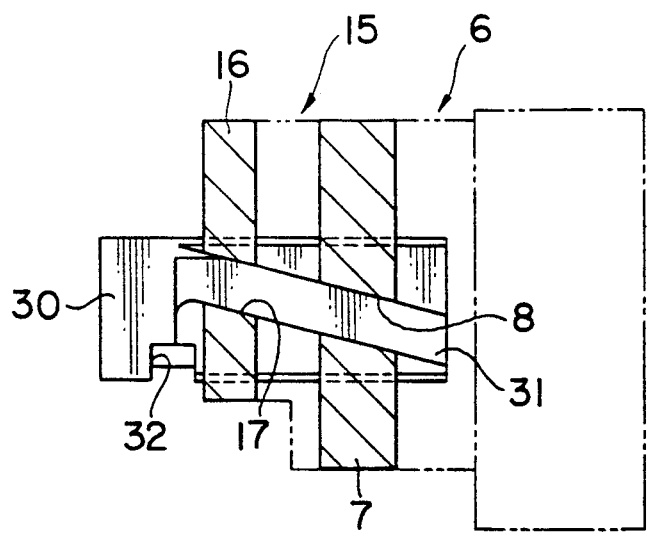
FIG. 5 is a view illustrating the relationship among a wedge bar, a clamping pawl and a slide block.

A pair of bar-shaped guides 16 projecting from the opposite side surface of the slide block 15 are radially slidably fitted into the block guide groove 3 in opposing relationship with the clamping pawl 6. As shown in FIG. 5, a guide groove 17 is formed transversely at the mid portion between the radial ends of the guide block 16. The guide groove 17 is inclined with the same angle as the angle of inclination of the wedge groove 8. Axially slidably fitted through the slide block 15 is the above mentioned safety pin 18 which is fitted into the pin recess 9 with a small play in the radial direction and whose forward stroke end is limited. As shown in FIG. 1, a pusher 19 is axially slidably fitted through the chuck main body 1 at a position backward of the safety pin 18. The pusher 19 is normally biased forward under the force of a bias spring 21 loaded between the pusher 19 and a back cover 20 of the chuck main body 1, and its forward (righthand) end is in abutting contact with the rear end surface of the safety pin 18.

Figure 3:
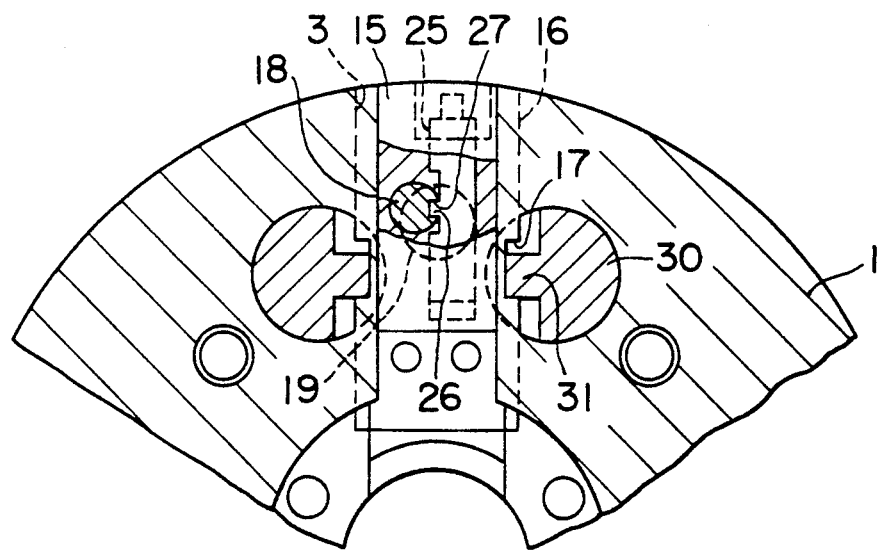
FIG. 3 is a sectional view taken along the line III—III of FIG. 1.

As shown in FIGS. 1 and 3, an operation pin 25 is fitted through the slide block 15 on one side of the safety pin 18 in such a way that it can slide within a predetermined stroke in the radial direction. The operation pin 25 has a lateral projection 26 inclining relative to the longitudinal axis thereof and slidably engaged in an inclined groove 27 of the safety pin 18 so that the movement of the operation pin 25 in the radial direction of the chuck main body 1 will cause a movement of the safety pin 18 in the forward and backward directions.

Figure 2:
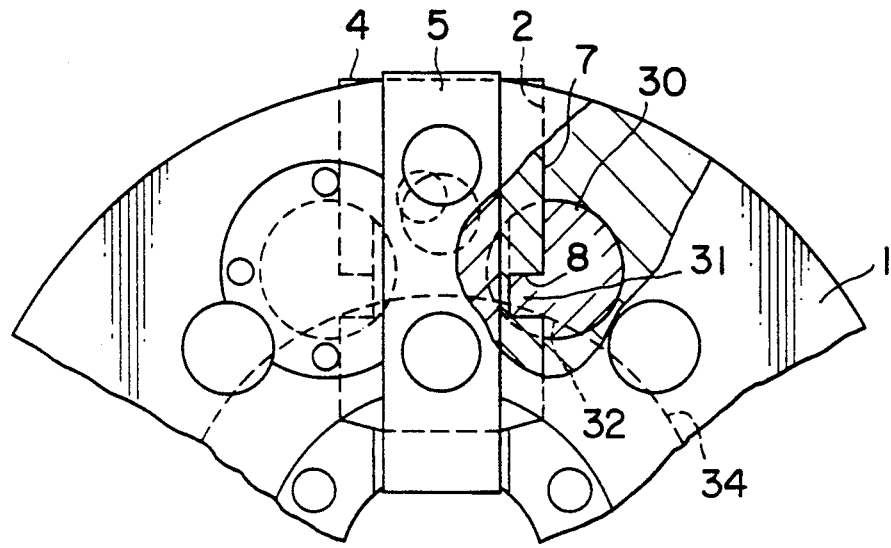
FIG. 2 is a fragmentary front view thereof as viewed from the right side of FIG. 1.
Figure 7A:
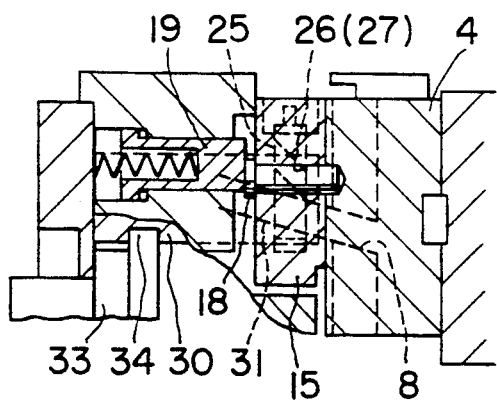
FIG. 7A is a fragmentary sectional view used to explain the mode of operation of the first embodiment.

Referring next to FIGS. 2 and 3, wedge members or bars 30 are fitted in the chuck main body 1 across the pawl and block guide grooves 2 and 3 in such a way that they can slide within a predetermined stroke. As best shown in FIGS. 4 and 5, each wedge bar 30 has integral therewith an elongated sloping ledge 31 which is so extended as to slidably engage both the wedge groove 8 and the guide groove 17. The ledge 31 forms wedge action means of the wedge bar 30. The leading end of the ledge 31 is chamfered so that it can easily enter the rear inlet of the wedge groove 8. As shown in FIGS. 2 and 5, an engaging groove 32 with an arcuate bottom is formed at the rear portion of the wedge bar 30 adjacent to the rotational axis of the chuck to engage a projection 34 (FIG. 1) of a plunger 33, which is hydraulically slidable in the axial direction of the chuck so that the plunger 33 and the wedge bar 30 are movable in unison in the axial direction. Therefore, as the plunger 33 is moved in the axial direction, the wedge bar 30 will be displaced forward or backward so that the clamping pawl 6 and the slide block 15 will be caused to move in the radial direction by virtue of the wedge action of the ledge 31. The stroke in the axial direction of the plunger 33 or the wedge bar 30 is so determined that when the plunger 33 is at the backward stroke end as indicated in FIG. 7A, the ledge 31 of the wedge bar 30 will be disengaged backwardly from the wedge groove 8 of the clamping pawl 6.

Next the mode of the operation of the first embodiment with the construction described above will be described hereinafter In the case of the replacement of the clamping pawls 6 adapted to hold a workpiece with a high degree of accuracy desired, the plunger 33 is withdrawn to its backward stroke end from the position shown in FIG. 1, so that the wedge bar 30 is caused to move backwardly in unison with the plunger 33 with the ledge 31 in engagement with both the wedge and guide grooves 8 and 17, whereby both the clamping pawl 6 and the slide block 15 in mutually opposing relationship will be caused to move independently of each other toward the center axis of the chuck while maintaining the geometrical relative relationship between them in respect of the radial direction. Concurrently the rear end surface of the safety pin 18 will be moved downwardly in sliding contact with the front end surface of the pusher 19 while the forward end of the safety pin 18 remains fitted into the pin recess 19 with some play. When the plunger 33 reaches the backward stroke end, the ledge 31 of the wedge bar 30 will be disengaged from the wedge groove 8 of the clamping pawl 6 so that the latter will be free to fall in the radial direction, but is prevented from falling by means of the positioning or locating pin 12. Therefore, even if the chuck is rotated by an erroneous operation by the operator with the plunger 33 being at its backward stroke end, the ejection of the clamping pawl 6 out of the chuck can be positively prevented whereby the safe operation can be ensured. (See FIG. 7A).

Figure 7B:
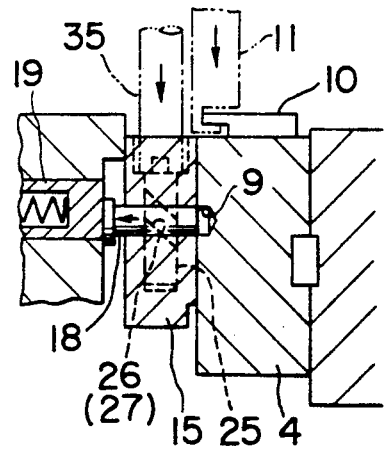
FIG. 7B is a view similar to FIG. 7A, showing a different state.

Thereafter, a clamping pawl replacement device (not shown) operates to cause its clamping pawl engaging member 11 to engage with the hook 10 and a push pin 35 of the device forces the operation pin 25 radially inwardly of the chuck. As a result, due to the mutual sliding engagement between the inclined lateral projection 26 and the inclined groove 27, the safety pin 18 will be forcibly retracted against the biasing action of the pusher 19, whereby the forward end of the safety pin 19 will be released from the pin recess 9 as shown in FIG. 7B. Then the clamping pawl engaging member 11 operates to withdraw the clamping pawl 6 in the radially outward direction so that the positioning or locating pin 12 will be disengaged from the locating recess 13 and the clamping pawl 6 will be withdrawn out of the pawl guide groove 2 to the outside.

Next a new clamping pawl 6 will be fitted into the pawl guide groove 2 and the positioning or locating pin 12 will fit into the locating recess 13 of the slide block. 15 so that the replaced clamping pawl 6 will be located in respect of the radial direction of the slide block 15 and the clamping pawl 6. Under such a condition, the operation pin 25 which has been pushed radially inwardly will be released and the safety pin 18 will be advanced under the force of the spring 21 to fit into the pin recess 9. Thereafter, the wedge bar 30 will be forced to move forwardly to cause its ledge 31 to fit into the wedge groove 8 of the clamping pawl 6. Thus, the replacement of the clamping pawl 6 is accomplished.

The wedge groove 8 of the newly replaced clamping pawl 6 is now in direct engagement with the ledge portion 31 of the wedge bar 30. As a consequence, in contrast with the conventional clutch in which the clamping pawl is connected to the master jaw, which is operated by the wedge bar, via intermeshing racks, the accumulation of machining errors can be minimized; the variations in position in respect of the radial direction of the attachment of the clamping pawls can be remarkably reduced to a minimum; and the accuracy with which the chuck holds the workpiece can be considerably improved.

In the first embodiment, so far it has been described, the wedge bar 30 is disposed along one side of each pawl guide groove 2 and is forced to move in the axial direction of the chuck by the engagement with the plunger so that the ledge 31 can be disposed in the vicinity of the outer peripheral surface of the chuck main body 1. Therefore, the axial through space in the chuck can be enlarged in diameter. In addition, the pusher 19 for pushing the safety pin 18 is disposed in the chuck main body so that, as compared with the conventional master jaw, the slide block 15 can be considerably made small in size. As a result, the total mass of the parts which are guided in the radial direction; that is, of the slide blocks 15 and the clamping pawls 16 can be made small so that the centrifugal forces exerted to these parts during the rotation of the chuck can be decreased and therefore the workpiece holding force of the chuck rotating at high rotational speed is prevented from becoming weaker.

Figure 8:
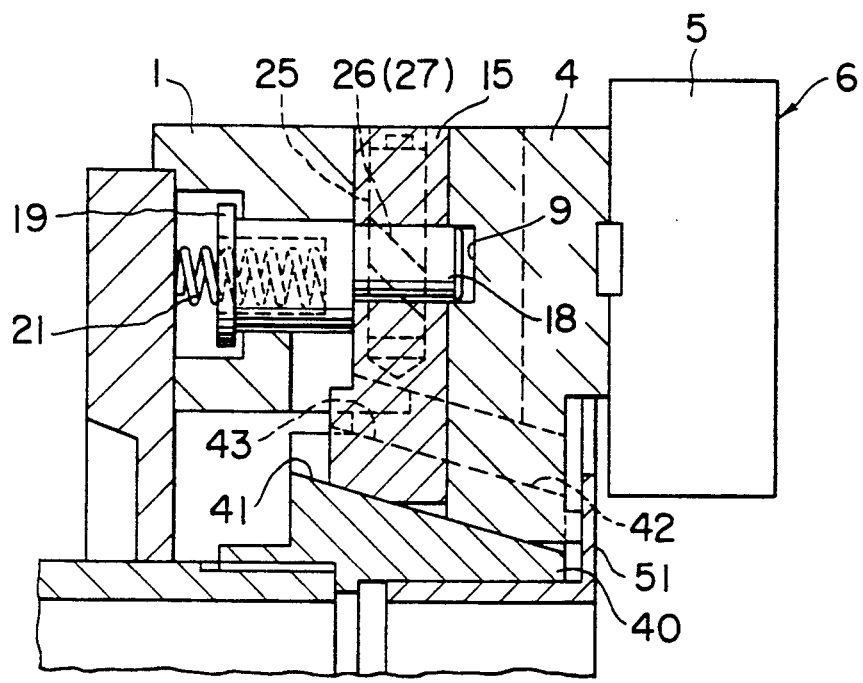
FIG. 8 is a fragmentary sectional view similar to FIG. 1, showing a second embodiment of the present invention.

Next referring to FIG. 8, a second embodiment of the present invention which uses a conventional wedge plunger 40 will be described. The wedge plunger or wedge member 40 has an inclined groove 41 sloping downward forwardly in the axial direction and in engagement with a sloping ledge 42 formed on both the slide block 15 and the clamping pawl 6 at their portions nearest to the center axes of the chuck. Except for the above-described construction, the second embodiment is substantially the same as the first embodiment described above with reference to FIGS. 1 through 7.

In the first and second embodiments, it has been described that both the slide block and the clamping pawl are made into engagement with the wedge member via wedge action means with higher degree of accuracy. It is to be understood however that while the clamping pawl is made into engagement with the wedge member with higher degree of accuracy, the slide block may be made into engagement therewith with a small play. In order to permit smooth insertion of the leading end of the wedge member due to such small play into the rear end of the wedge groove (sloping ledge) of the clamping pawl located by the positioning or locating pin, the rear end inlet of the wedge groove must be sufficiently chamfered. Furthermore, the displacement in the axial direction of the safety pin 18 may be accomplished by the rotation of an eccentric cam whose rotational axis is perpendicular to the direction of the displacement of the safety pin 18.

Figure 9:
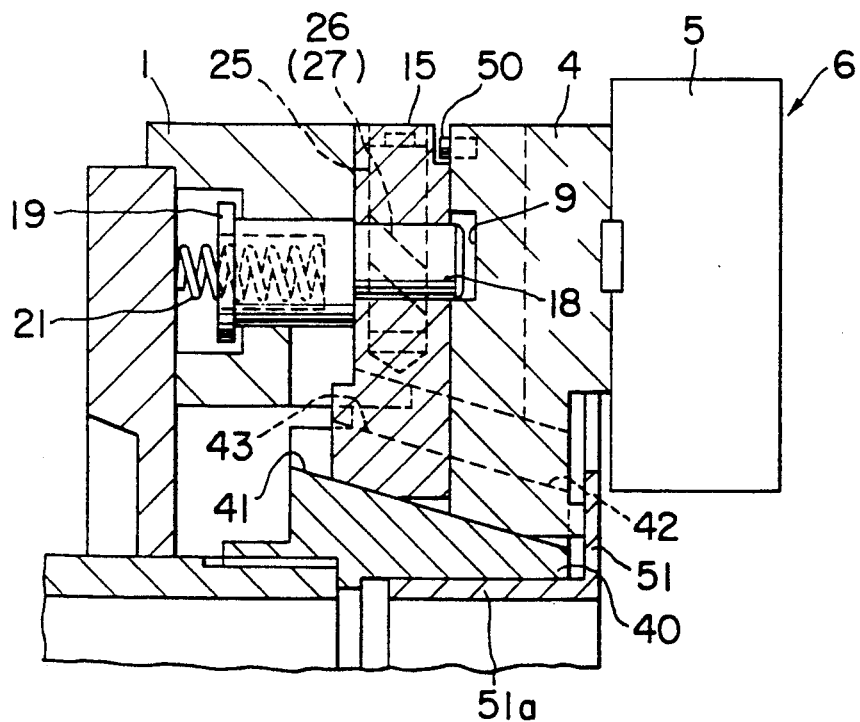
FIG. 9 is a view similar to FIG. 8, showing a third embodiment of the present invention.

Referring next to FIG. 9, a third embodiment of the present invention will be described. This embodiment is substantially the same in construction to the first and second embodiments except for positioning or locating means. In this embodiment, the positioning or locating means comprises a safety pin 18 that limits the radially outward displacement of the clamping pawl 6 away from the slide block 15, and an abutment pin 50 that projects from the rear surface of the base jaw 4 to limit radially inward displacement of the clamping pawl 6 relative to the slide block 15. In the third embodiment, instead of providing the abutment pin 50, the radially inner end of the clamping pawl 6 can be made to abut against a boss portion 51a of a pilot plate 51 so as to limit the radially innermost position of the clamping pawl 6.

What is claimed is:

1. A chuck for machine tools of the type having a main body with a rotational axis, wedge members provided in said main body so as to be slidable axially of the main body, and workpiece clamping pawls fitted in the main body so as to be movable radially of the main body, said clamping pawls slidably engaging said wedge members, respectively, so as to be removed radially outwardly from the main body for replacement, in response to axial sliding movement of the wedge members, said chuck comprising:

slide blocks fitted in said main body so as to be slidable radially of the main body, said slide blocks being disposed axially behind said clamping pawls so as to be associated with the same, respectively;

wedge action means provided on said wedge members, respectively, and extending slopingly relative to the rotational axis, said wedge action means normally slidably engaging both said clamping pawls and said slide blocks and having such a length as to be disengaged from the clamping pawls to release the same when the wedge members are axially moved away from the clamping pawls to a limit position; and positioning means interposed between the associated slide blocks and the clamping pawls to releasably engage the slide blocks and the clamping pawls at their predetermined relative radial position.

2. The chuck according to claim 1, wherein said wedge action means are ledges on the wedge members, and said slide blocks and clamping pawls have sloping grooves engaging said ledges, respectively.

3. The chuck according to claim 1, wherein said wedge action means are grooves in the wedge members, and said slide blocks and clamping pawls have sloping ledges engaging said grooves, respectively.

4. The chuck according to claim 1, wherein said limit position is provided by a back cover, as an abutment, on the main body.

5. The chuck according to claim 1, wherein said positioning means comprises a safety pin passed axially through each of the slide blocks, a pin recess formed on a back side of each of said clamping pawls, and means urging said safety pin into engagement with said pin recess.

6. The chuck according to claim 5, further comprising operation means engaging said safety means to shift the same out of engagement with said pin recess.

7. The chuck according to claim 5, further comprising abutment means for limiting radially inward movement of the clamping pawls relative to the slide blocks.

* * * * *